Figure 5:
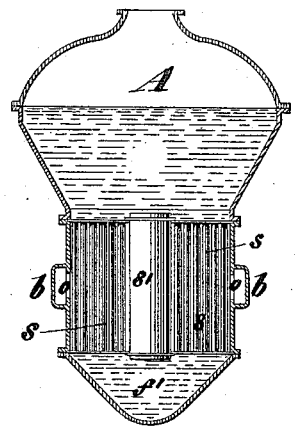

(No Model.) 3 Sheets—Sheet 1.
A. MILLER.
EVAPORATING APPARATUS.
No. 357,404. Patented Feb. 8, 1887.
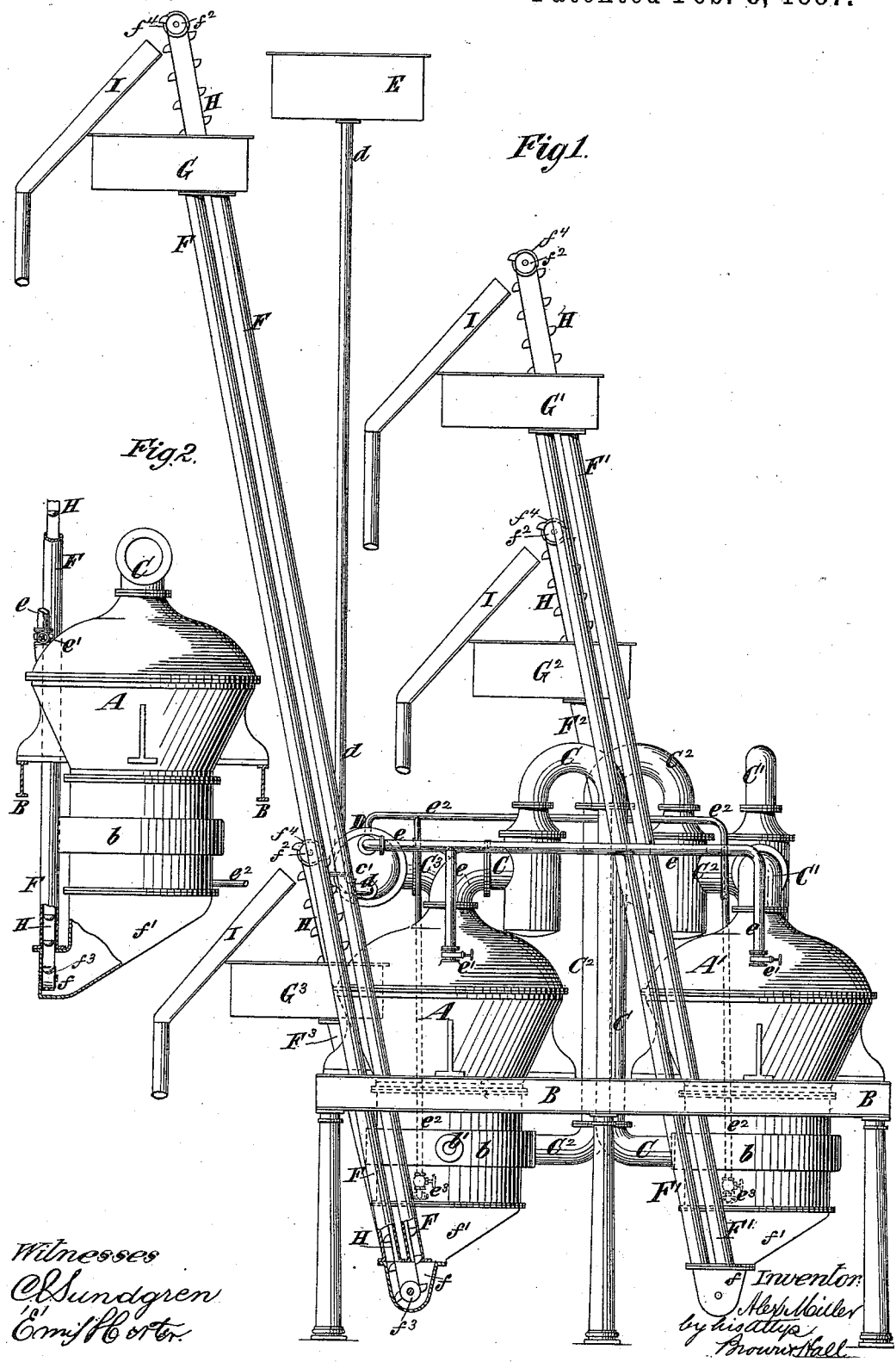

(No Model.) 3 Sheets—Sheet 2.
A. MILLER.
EVAPORATING APPARATUS.
No. 357,404. Patented Feb. 8, 1887.
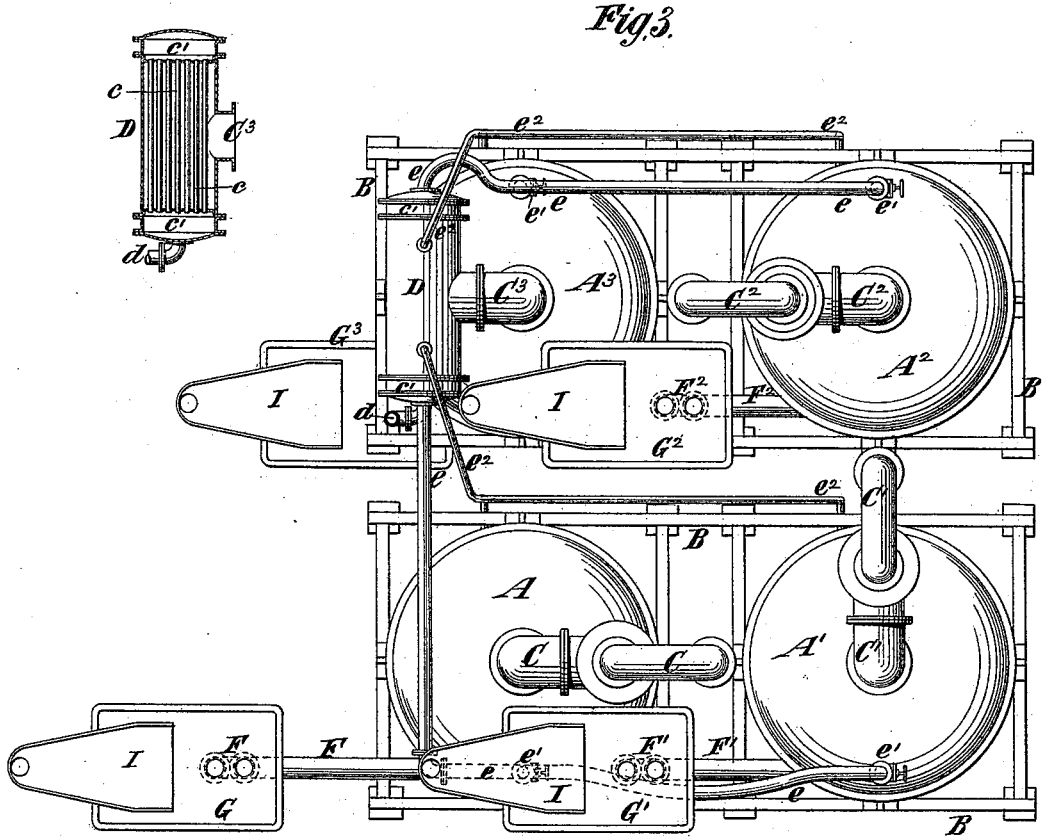
Witnesses:
C. L. Sundgren
Emil H. Corter
Inventor:
Alex. Miller
by his Attys
Brown & Hall (No Model.) 3 Sheets—Sheet 3.

A. MILLER.
EVAPORATING APPARATUS.

No. 357,404. Patented Feb. 8, 1887.

Witnesses.
C. Sundgren
Emil Horter

Inventor.
Alex Miller
by his attys
Brown & Hall

UNITED STATES PATENT OFFICE.

ALEXANDER MILLER, OF NEW YORK, N. Y., ASSIGNOR OF ONE-HALF TO ROBERT DEELEY, OF SAME PLACE.

EVAPORATING APPARATUS.

SPECIFICATION forming part of Letters Patent No. 357,404, dated February 8, 1887.

Application filed April 28, 1886. Serial No. 200,393. (No model.)

*To all whom it may concern:*

Be it known that I, ALEXANDER MILLER, of the city and county of New York, in the State of New York, have invented a new and useful Improvement in Evaporating Apparatus, of which the following is a specification.

My invention relates more particularly to closed evaporating-pans which are employed for evaporating salt; but the invention may be advantageously employed in evaporating apparatus for other purposes in which a pressure is maintained within the evaporating-pan as distinguished from a vacuum evaporating-pan.

One feature of my invention may be employed in a single evaporating-pan, the object thereof being to provide a convenient means for continuously withdrawing or removing the precipitant from the pan without relieving or reducing the pressure and consequent temperature in the pan. This feature of my invention consists in the combination, with a closed evaporating-pan, of a hollow column extending upward above the pan and communicating at the lower end with the liquid in the pan and at the upper end with the atmosphere, and an elevating apparatus working within the hollow column and by which the precipitant is delivered continuously from the pan.

In the above combination I preferably construct the evaporating-pan with a pit or pocket at one side of its lower portion and toward which the bottom of the pan inclines, so that the salt or other precipitant will all gravitate toward the pit or pocket, and the hollow column containing the elevating apparatus extends upward from this pit or pocket at the side of or above the pan.

In the manufacture of salt, there being a large quantity of water evaporated in order to precipitate the salt, it is very desirable, in order to secure low cost of manufacture, to save the heat used in transferring the water into vapor, the only amount of heat required being that quantity necessary to raise the temperature of the salt from the temperature at which it comes from the salt-wells to the temperature at which it is discharged from the evaporating apparatus. To accomplish this most economically, all the heat of the vapors from one pan are used to evaporate in subsequent pans or operations, as is usual in multiple-effect evaporating apparatus. It is necessary that there be a reduction in temperature from the first pan, which is heated by steam, to each subsequent pan, so that there will be a transfer of heat from one pan to the other.

To secure automatically the reduction in pressure and consequent heat throughout the series of pans is the object of another feature of my invention; and to this end the invention also consists in the combination, with two or more closed evaporating-pans connected in series, so that the vapors from each serve to heat the next in the series, of hollow columns extending to unequal heights above the pans, and communicating at their lower ends with the liquid in the pans, and at their upper ends with the atmosphere, whereby a pressure and consequent temperature, gradually decreasing from pan to pan, may be automatically maintained throughout the series. In these hollow columns I preferably arrange elevating apparatus for delivering the precipitant continuously from the pans, as above described.

Figure 6:
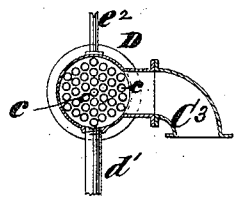

In the accompanying drawings, Figure 1 is an elevation of a multiple-effect evaporating apparatus embodying my invention and comprising four pans. Fig. 2 is a side elevation, partly in section, of one of the pans in a plane at right angles to Fig. 1, showing the pit or pocket from which the hollow column extends and the inclined bottom whereby the precipitant is caused to gravitate toward said pit. Fig. 3 is a plan of the apparatus. Fig. 4 is a horizontal section of the heater, which may be employed for raising the temperature of the brine or other liquor by means of the vapor escaping from the last pan of the series and before its introduction to the several pans. Fig. 5 represents a vertical section of one of the pans in a plane at right angles to the plane of Fig. 2, showing its internal construction and the approximate level of brine or other liquid maintained therein; and Fig. 6 is a vertical transverse section of the heater.

Similar letters of reference designate corresponding parts in all the figures.

A A' A² A³ designate four closed evaporating-pans, which may be supported by a suitable frame-work, B, and which are connected in series for multiple effect. The lower portion of each pan is constructed in any of the well-known ways for applying the heating-vapor to heat the contents of the pans. For example, the lower portion of each pan may comprise a section which contains vertical heating-tubes $s$, as shown in Fig. 5, through which the liquid in the pan has free circulation upward, and a central throat or passage, $s'$, through which the downward circulation may take place, and the steam or heating-vapor circulates freely around the tubes and throat $s\ s'$.

Each of the pans may be constructed at its lower portion with a surrounding belt or jacket, $b$, into which the heating-vapor enters, and the jacket $b$ of the first pan, A, may have an inlet-nozzle, $b'$, as shown in Fig. 1, for the introduction of steam.

The jacket or belt $b$ is simply for the purpose of conducting the steam or vapor all around the heating-section of the pan, so that it may be evenly distributed among the tubes $s$, several openings, $o$, from the belt to the interior of the heating drum or section being provided for the free entrance of steam, as shown in Fig. 5. The steam or vapor from the belt $b$ does not enter the pan proper at all, but simply comes in contact with the exterior of the tubes $s$, through which the liquid in the pans circulates. This construction of the pans, as shown in Fig. 5, is a usual one, and in itself constitutes no part of my invention.

From the first pan, A, the vapor driven off passes by a pipe or conduit, C, to the lower portion of the second pan, A', and serves to heat the contents thereof. From the second pan, A', the vapor passes by a pipe or conduit, C', to the lower portion of the third pan, A$^2$, and serves to heat the contents of said third pan. From the top of the third pan, A$^2$, the heating-vapor passes by a pipe or conduit, C$^2$, to the lower portion of the fourth pan, A$^3$, and from the fourth pan the vapor, of comparatively low temperature, is conducted away through a pipe or conduit, C$^3$, to a heater, D. (Shown in Fig. 3 and also in Fig. 1.) The position in which this heater D is placed is not material to the invention. It may be placed in any position—as, for instance, the ground floor, on which the apparatus stands, or on an extension platform which is supported by the frame-work B. This heater may be of any well-known construction, such as is common in surface-condensers, and is represented in Fig. 4. The heater there shown has a shell or body containing series of tubes $c$, and has at opposite ends distributing chambers or heads $c'$. The liquor to be evaporated is taken from an elevated tank, E, (shown in Fig. 1,) or is supplied by a pump, in either case passing through a pipe, $d$, to the distributing-chamber or hollow head $c'$ at one end of the heater D. The vapor escaping from the pan A$^3$ through the pipe or conduit C$^3$ by circulating around the tubes $c$ imparts its heat to the liquor which circulates through said tubes and between the distributing-chambers or hollow heads $c'$ of the heater. From these distributing-chambers or hollow heads $c'$ the heated liquor may pass from the heater through pipes $e$, which are provided with valves $e'$, to the several pans of the apparatus, and admitted to them severally as may be required to maintain the quantity of liquor in them, or continuously, if desired.

I have shown the pipes $e$ as leading from both distributing-chambers or hollow heads $c'$ of the heater; but they might extend only from the chamber or hollow head at the opposite end of the heater from that with which the supply-pipe $d$ communicates. Inasmuch, however, as the supply-pipe $d$ communicates with the lower portion of the heater, and the pipes $e$ with the upper portion of the heater, as shown in Fig. 1, there will always be a sufficient circulation through the tubes $c$ to insure the heating of the liquor before it passes through the pipe $e$, which is connected with the same end of the heater as the supply-pipe $d$. Not only does the heater receive as a heating agent the vapor from the last pan, A$^3$, but it may also receive the hot water of condensation from the lower heating section or drum of each of the pans, and this water may be delivered to the heater from the lower portion of the heating-drums through pipes $e^2$, provided with valves $e^3$. The pressure of the heating steam or vapor in the several heating-drums is sufficient to raise the water of condensation through the pipes $e^2$ to the heater D; but the valves $e^3$ are so regulated that the pressure of vapor in the heating-belts will force the water of condensation past them into the heater D without allowing any material quantity of the heating vapor to escape through the pipes $e^2$. All water of condensation escapes from the body of the heater D through an outlet-pipe, $d'$, (shown in Fig. 6,) and may be allowed to run to waste or employed for feeding boilers or other purposes.

So far as described the apparatus does not necessarily include my invention; but I will now proceed to describe particularly wherein the invention consists.

As before stated, the pressure and consequent temperature in the several pans should decrease gradually from the first pan, A, throughout the series to the last pan, A$^3$, and I automatically control the pressure and consequent temperature within the several pans by means of hollow columns F F' F$^2$ F$^3$, which extend upward to unequal heights above the several pans, and the lower ends of which communicate with the liquid in the pan, while their upper ends are connected with open pans or pockets G G' G$^2$ G$^3$, which are exposed to the atmosphere. Consequently it will be seen that the pressure in each of the pans will be controlled by the height of liquid column in the hollow columns F F', &c., and that this pressure will control the temperature at which the contents of each of the pans will boil and give off vapor.

As shown in Fig. 1, the hollow column F from the first pan, A, is the highest, and consequently the greatest pressure and temperature will be maintained in the first pan, A, and the height of the several columns is decreased step by step throughout the series of pans, the column $F^3$ springing from the last pan of the series, $A^3$, having a height not materially above the level of the liquor in the pan, and consequently the liquor in the last pan will boil at about the atmospheric pressure.

The operation of the apparatus will be as follows: All the pans A A' $A^2$ $A^3$ are filled with brine or other liquid up to about the level indicated in Fig. 5, and steam is turned onto the heating-belt of the pan A, where, by contact with the tubes $s$, it imparts its heat to the liquid in the pan A. Ebullition immediately takes place in the pan A, and the vapors pass off through the pipe C into the heating-belt $b$ of the pan A', and are by contact with the tubes in the pan A' condensed, thereby imparting their heat to the liquid in the pan A'. The vapors from the pan A' pass over through the pipe C' into the heating-belt $b$ of the pan $A^2$, and the vapors from the pan $A^2$ pass over through the pipe $C^2$ into the heating-belt of the pan $A^3$, and the vapors from this latter pan pass over into the heater D. By the time the liquid in the pan $A^3$ has attained a temperature of 212°, or slightly above it, the liquid in the pan $A^2$ will be boiling at a higher temperature, as its vapor has to supply heat enough to produce vapor in the pan $A^3$ and to also supply heat carried off by the discharge of precipitant as well as that dissipated by radiation from the pan $A^3$ and from the upper part of the pan $A^2$; but the increased temperature in the pan $A^2$ is accompanied by an increased pressure, which causes a small portion of the liquid in the pan $A^2$ to rise in the hollow column $F^2$ to a height due to the pressure maintained in the pan $A^2$, and to which height the hollow columns are made to conform. The height of liquid in the hollow columns is not the object sought, but is simply the result of maintaining a certain temperature in the pan and providing a ready means of discharging the precipitant. The same differences are produced between the pans $A^2$ and A', but to a greater degree, and so on to the pan A, where the highest temperature is maintained, due to the temperature of steam admitted into the heating drum or section of the pan A. Thus it will be seen that a certain quantity of heat has been put into the pan A, and has resulted in producing vapor or steam from the contents of said pan to heat the contents of the pan A', and by the time this heat passes through all the pans and reaches the heater D it is all dissipated, except the comparatively small quantity passing off through the heater D from the pipe $d'$ in the condition of water of condensation, and it follows that a reduction in temperature of the heat in the several pans results in a consequent reduction of pressure from one pan to the other.

The number of pans and the height of the columns should be such that the vapor from the last pan will only be sufficient to raise the temperature of the brine or liquor in the heater D to nearly the boiling-point. Under these conditions all the vapor from the last pan will be condensed in the heater by the cold, thereby preventing any discharge of vapor from the apparatus which would involve a waste of heat. There is consequently no waste of heat in the apparatus except that which is due to radiation, and this, from the nature of things, cannot be entirely prevented, but is reduced to the minimum by the use of non-conducting covering for the pans, pipes, &c. The water of condensation from the vapors in the heating-drums of the several pans, being necessarily at the temperature due to their respective pressures, is also discharged into the heater with the vapor from the last pan, and there parts with its surplus heat to the brine or liquor; hence all of the water separated by evaporation from the resultant solid materials finally is discharged from the heater and at a comparatively low temperature, considerably below the boiling-point. This is the measure of the economy of the apparatus, there being no discharge of heat except by this water of condensation and by the solid materials produced, there being no discharge of vapor, which is a great conveyer of heat, the specific heat of the solid materials of the solution being very small compared with the heat required to effect the evaporation of the water; and as the only heat carried off in the apparatus is that required to heat the solid materials of the solution plus a small percentage due to radiation, the smaller the percentage of this solid matter the greater will be the number of pans required to precipitate enough solid material to absorb all the heat entering the first pan, it being readily understood that in the first pan the heat carried off by the solid materials from this pan is small compared with the heat passing on into the second pan with the vapors. The same thing exactly takes place in the second pan, and so on through each of them until the vapors arising from the last pan are just sufficient to heat the liquid which is being fed to the apparatus up to near its boiling-point.

Not only do the upwardly-extending hollow columns F, &c., serve to control the pressure and consequent temperature in the several pans, but they also afford a convenient avenue for the discharge of precipitant from each pan. As best seen in Fig. 1, I have represented an elevating apparatus, H, as arranged in each hollow column, and in order to accommodate the ascending and descending portions of this elevator-belt I have represented each column F F', &c., as composed of two tubes extending parallel with each other from an elevator pit or pocket, $f$, at the bottom of each pan upward to a corresponding pan or open vessel, G G', &c. As best shown in Fig. 2, the elevator pit or pocket $f$ of each pan is at the side of its lower portion and projects beyond the side of the pan, and the bottom $f'$ of each pan inclines toward this elevator pit or pocket $f$, so as to deliver thereinto by gravity the salt or other solid precipitant. The elevator bands or belts pass around upper and lower drums or pulleys, $f^2 f^3$, in the usual way, and may be driven each by a belt running on a pulley, $f^4$, at the upper end of the elevator.

Each elevating apparatus H may deliver the solid material into or through a spout or conductor, I, as shown in Fig. 1.

The method of evaporating by triple or quadruple effect and under a pressure greater than the atmosphere, which results from the use of the apparatus herein shown and described, I do not here claim, as such method is the subject of an application for Letters Patent filed January 25, 1887, having Serial No. 225,419.

What I claim as my invention, and desire to secure by Letters Patents, is—

1. The combination, with a closed evaporating-pan, of a hollow column extending upward above the pan and communicating at the lower end with the liquid in the pan and at the upper end with the atmosphere, and an elevating apparatus working within the hollow column, whereby the precipitant is delivered continuously from the pan, substantially as herein described.

2. The combination, with a closed evaporating-pan having at the side of its lower portion a pit toward which the bottom of the pan inclines, of a hollow column extending upward from said pit above the pan and open at the upper end, and an elevating apparatus working within the hollow column to remove the precipitant from the said pit, substantially as herein described.

3. The combination, with two or more closed evaporating-pans connected in series, so that the vapors from each serve to heat the next in the series, of hollow columns extending upward to unequal heights above the several pans and communicating at their lower ends with the liquid in the pans and at their upper ends with the atmosphere, and elevating apparatus working within the hollow columns to continuously remove the precipitant from the pans, substantially as herein described.

ALEX. MILLER.

Witnesses:
C. HALL,
FREDK. HAYNES.